(12) United States Patent
Goto

(10) Patent No.: US 7,866,860 B2
(45) Date of Patent: Jan. 11, 2011

(54) HANDLE ASSEMBLY WITH CONTROLLED LIGHT DISTRIBUTION

(75) Inventor: Kazuhiro Goto, Markham (CA)

(73) Assignee: Tyco Electronics Canada ULC, Markkam, Ontario (CA)

( * ) Notice: Subject to any disclaimer, the term of this patent is extended or adjusted under 35 U.S.C. 154(b) by 184 days.

(21) Appl. No.: 12/177,407

(22) Filed: Jul. 22, 2008

(65) Prior Publication Data

US 2010/0020558 A1    Jan. 28, 2010

(51) Int. Cl.
*B60Q 1/26* (2006.01)
(52) U.S. Cl. .................. 362/501; 362/511; 362/558
(58) Field of Classification Search ........... 362/555, 362/558, 560, 570, 501, 511, 490; 16/444; 296/215
See application file for complete search history.

(56) References Cited

U.S. PATENT DOCUMENTS

| | | | | |
|---|---|---|---|---|
| 2,308,844 | A * | 1/1943 | Wilshusen | 362/540 |
| 6,164,805 | A * | 12/2000 | Hulse | 362/501 |
| 7,210,815 | B2 * | 5/2007 | Imade | 362/234 |
| 7,240,452 | B2 * | 7/2007 | Ho | 42/124 |
| 7,270,452 | B2 * | 9/2007 | Wang | 362/501 |
| 7,374,319 | B2 * | 5/2008 | Camarota et al. | 362/399 |
| 7,400,232 | B2 * | 7/2008 | Reichling et al. | 340/426.36 |
| 7,635,210 | B2 * | 12/2009 | Metros et al. | 362/501 |

* cited by examiner

*Primary Examiner*—Stephen F. Husar
*Assistant Examiner*—Peggy A. Neils

(57) ABSTRACT

A handle assembly includes a bezel having a handle cavity defined by a cavity wall and an open front providing access to the handle cavity. The bezel has a slot through the cavity wall and a lamp assembly is mounted to the bezel proximate the slot. The lamp assembly includes a housing and a light pipe held by the housing, where the light pipe includes a first leg extending along a primary axis and a second leg extending along a secondary axis generally perpendicular with respect to the primary axis. The second leg has a lens along an inner surface of the second leg, wherein light is directed through the light pipe along the primary axis to a primary reflective surface provided at the intersection of the first and second legs. The primary reflective surface directs light along the second leg toward the lens.

23 Claims, 7 Drawing Sheets

US 7,866,860 B2

HANDLE ASSEMBLY WITH CONTROLLED LIGHT DISTRIBUTION

BACKGROUND OF THE INVENTION

The subject matter herein relates generally to an illuminated handle assembly, and more particularly, to a handle assembly having a light pipe directing light to an area of interest of the handle assembly.

Handle assemblies, such as those used in the interior of an automobile, typically include a bezel that is mountable to a door panel. The bezel includes a cavity that surrounds a handle of the door and that provides an area for an occupant of the vehicle to grasp the handle. As a convenience for the occupant, at least some known handle assemblies are illuminated such that the occupant can see the handle. These illuminated handle assemblies typically include a lamp assembly mounted on the exterior of the bezel within the door panel so as to be hidden from view. The lamp assembly shines light into the cavity of the bezel to illuminate the cavity.

Known illuminated handle assemblies are not without disadvantages. For instance, the lamp assemblies are typically mounted vertically above an opening in the bezel and shine light in one direction, typically downward, into the bezel cavity. The light tends to be focused on one area of the bezel cavity and not dissipated evenly or throughout the cavity. Additionally, with the known lamp assemblies, the lamp assembly tends to be mounted generally centered on the bezel and shines the light approximately at the middle of the handle, where much of the light is visibly blocked by the handle, and therefore does not properly or adequately illuminate the cavity for the occupant. Furthermore, most known lamp assemblies are directly mounted to the bezel such that at least some of the light from the lamp assembly is leaked or otherwise dissipated outside of the bezel. The stray light outside of the bezel may undesirably be seen through other portions of the door panel, such as through gaps between the bezel and the door panel, through gaps between other components that are mounted to the door panel, or through the top edge of the door panel, such as near the window.

A need remains for a handle assembly and lamp assembly that may be provided in a cost effective and reliable manner. A need remains for a handle assembly and lamp assembly that controls light distribution into a bezel of the handle assembly. A need remains for a handle assembly and lamp assembly that reduces stray light.

BRIEF DESCRIPTION OF THE INVENTION

In one embodiment, a handle assembly is provided including a bezel having a handle cavity defined by a cavity wall and an open front providing access to the handle cavity. The bezel has a slot through the cavity wall and a lamp assembly is mounted to the bezel proximate the slot. The lamp assembly includes a housing and a light pipe held by the housing, where the light pipe includes a first leg extending along a primary axis and a second leg extending along a secondary axis generally perpendicular with respect to the primary axis. The second leg has a lens along an inner surface of the second leg, wherein light is directed through the light pipe along the primary axis to a primary reflective surface provided at the intersection of the first and second legs. The primary reflective surface directs light along the second leg toward the lens.

Optionally, the inner surface may face the bezel. The lens may be aligned with the slot. The light pipe may extend along a transverse axis perpendicular to the primary axis and the secondary axis, wherein the reflective surface is oriented non-parallel to each of the primary axis secondary axis and transverse axis. The primary axis and the secondary axis may define a light pipe plane, where the reflective surface lie within the light pipe plane and direct light out of the light pipe plane.

In another embodiment, a lamp assembly is provided for illuminating a bezel of a handle assembly. The lamp assembly includes a housing having at least one chamber, a light source received in the at least one chamber, and a light pipe received in the at least one chamber proximate the light source. The light pipe has an inner surface and an outer surface opposite the inner surface, where the light pipe is received in the housing such that the inner surface is configured to face the bezel. The light pipe has a front, a back, a first end and a second end opposite the first end, where the light pipe is received in the housing such that the back is positioned proximate the light source. The light pipe has a first leg extending longitudinally from the back to the front and a second leg extending longitudinally from the first leg to the second end, with the second leg being generally perpendicular with respect to the first leg. The light pipe has a reflective surface positioned at the front of the first leg at the intersection of the first leg and the second leg and the reflective surface is angled toward the second leg to direct light generally along a longitudinal axis of the second leg and the reflective surface is angled toward the inner surface to direct the light toward the bezel.

In a further embodiment, a lamp assembly for illuminating a bezel of a handle assembly is provided including a housing configured to be mounted to the bezel and a light pipe received in the housing. The light pipe has a first leg extending along a primary axis and a second leg extending along a secondary axis generally perpendicularly from the first leg. The second leg has a lens along an inner surface of the second leg. The light pipe has a primary reflective surface at the intersection of the first leg and the second leg, with the primary reflective surface being angled at a tilt angle to direct the light generally along the secondary axis and with the primary reflective surface being angled at a slope angle to direct the light toward the lens. The light is emitted from the lens at an angle transverse to the primary axis and the secondary axis.

DETAILED DESCRIPTION OF THE INVENTION

Figure 1:
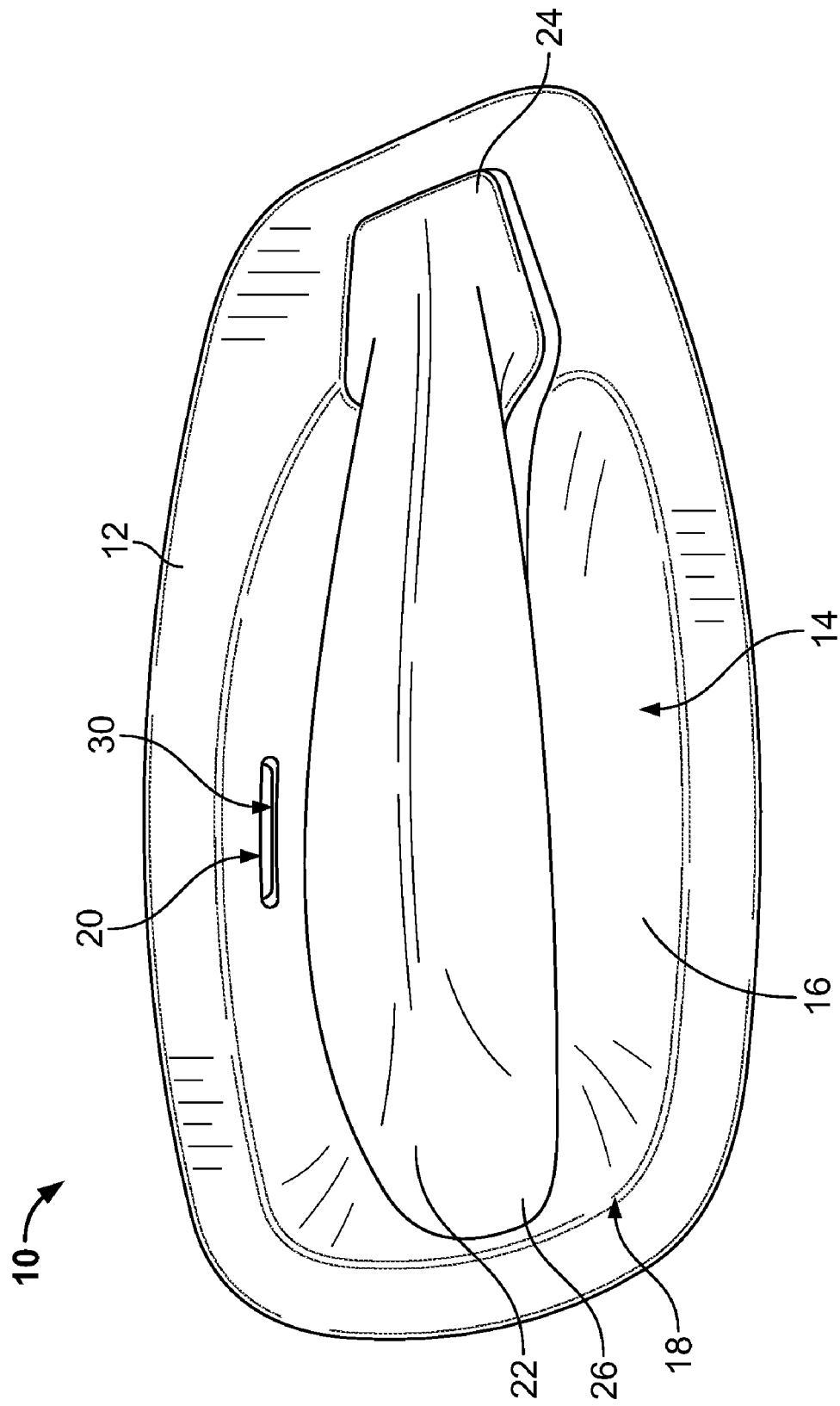
FIG. 1 illustrates a handle assembly formed in accordance with an exemplary embodiment.

FIG. 1 illustrates a handle assembly 10 formed in accordance with an exemplary embodiment. In the illustrated embodiment, the handle assembly 10 is an automotive handle assembly for use in an automobile, however the subject matter described herein may be used in different applications other than an automotive handle assembly.

The handle assembly 10 includes a bezel 12 adapted to fit within a door panel. The bezel 12 has a handle cavity 14 defined by a cavity wall 16. The cavity wall 16 is curved to form a cup shaped handle cavity 14. The bezel 12 also includes an open front 18 providing access to the handle cavity 14. A slot 20 extends through the cavity wall 16.

The handle assembly 10 includes a handle 22 for opening the door panel. The handle 22 is positioned generally within the handle cavity 14, however a portion of the handle 22 may extend from the handle cavity 14. The handle 22 extends through the cavity wall 16 and is operatively coupled to a release mechanism for releasing the door panel, such as to open the door. The handle 22 extends between a pivot end 24 and a free end 26. In operation, the occupant or operator grips the handle 22 and pulls the handle 22 out of the handle cavity 14 to open the door. When pulled, the handle 22 rotates about the pivot end 24. The handle cavity 14 provides adequate space or clearance between the handle 22 and the cavity wall 16 for the operator's hand to grip the handle 22.

The handle assembly 10 includes a lamp assembly 30 mounted to the bezel 12. A portion of the lamp assembly 30 is aligned with the slot 20 such that light from the lamp assembly 30 shines into the handle cavity 14. In an exemplary embodiment, the lamp assembly 30 is configured to control and direct the light into the handle cavity 14 to a target area.

Figure 2:
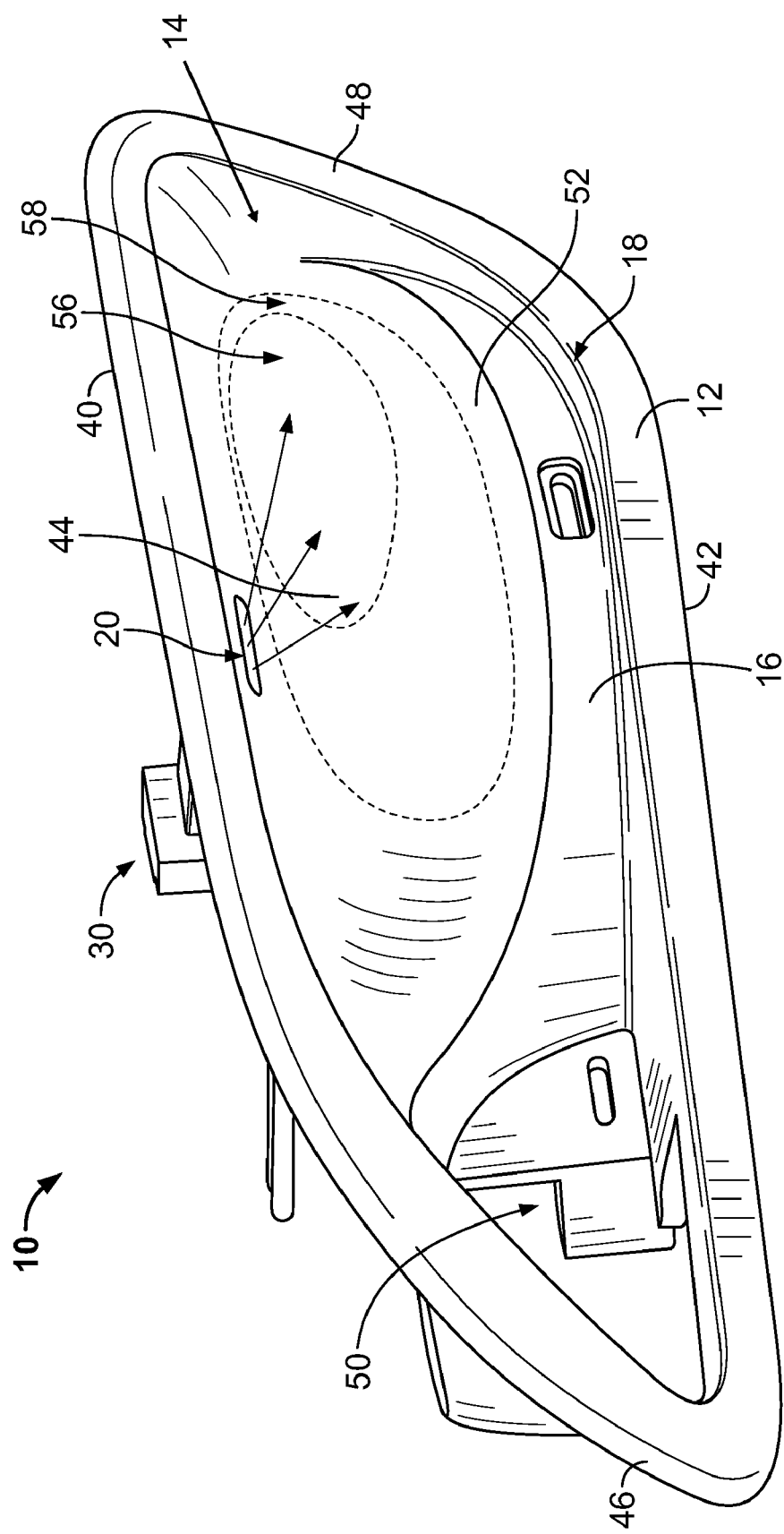
FIG. 2 is a perspective view of a portion of the handle assembly with a handle removed for clarity.

FIG. 2 is a perspective view of a portion of the handle assembly 10 with the handle 22 (shown in FIG. 1) removed for clarity. FIG. 2 illustrates a handle assembly 10 for the opposite door than the handle assembly 10 shown in. FIG. 1. FIG. 2 illustrates the bezel 12 and the lamp assembly 30. In a typical application, the bezel 12 is coupled to the door panel such that the handle 22 is oriented generally horizontally, and the components of the handle assembly 10 are described with reference to such an orientation. However, it is realized that different orientations are possible in alternative embodiments and terms describing relative locations such as top, bottom, forward, rearward, upward, downward and the like relate to the embodiment of a generally horizontal configuration.

The bezel 12 includes a top 40, a bottom 42 and a back 44 opposite to the front 18. The bezel 12 also includes a first end 46 and a second end 48. A handle opening 50 extends through the cavity wall 16 proximate the first end 46 and the handle 22 is configured to extend through the handle opening 50 into the handle cavity 14. The handle 22 is positioned in the cavity 14 such that the pivot end 24 of the handle 22 is proximate the first end 46 and the free end 26 is proximate the second end 48. The bezel 12 includes an interior surface 52 and an exterior surface 54 (shown in FIG. 3). The interior surface 52 defines the cavity 14.

In an exemplary embodiment, the slot 20 is provided proximate the top 40 of the bezel 12. The lamp assembly 30 is mounted to the top 40 of the bezel 12 such that a portion of the lamp assembly 30 extends into the slot 20. The lamp assembly 30 directs light into the cavity 14 to illuminate the cavity wall 16. In an exemplary embodiment, the lamp assembly 30 directs the light to a primary target area 56. The lamp assembly 30 also illuminates a secondary area 58 encompassing the primary target area 56. In an exemplary embodiment, the light is focused by the lamp assembly 30 such that the primary target area 56 is illuminated more than the secondary area 58. In an exemplary embodiment, the lamp assembly 30 directs the light generally rearward toward the back 44, as opposed to directing the light toward the handle 22 and/or through the front 18. Optionally, the primary target area 56 may be positioned closer to the bottom 42 than the top 40 and closer to the second end 48 than the first end 46. As such, the area of the cavity 14 near the free end 26 of the handle 22 is illuminated more than other portions of the cavity 14. The lamp assembly 30 may be configured differently in alternative embodiments to direct the light differently, such as to a different area of interest. The area of interest may be different for different applications.

Figure 3:
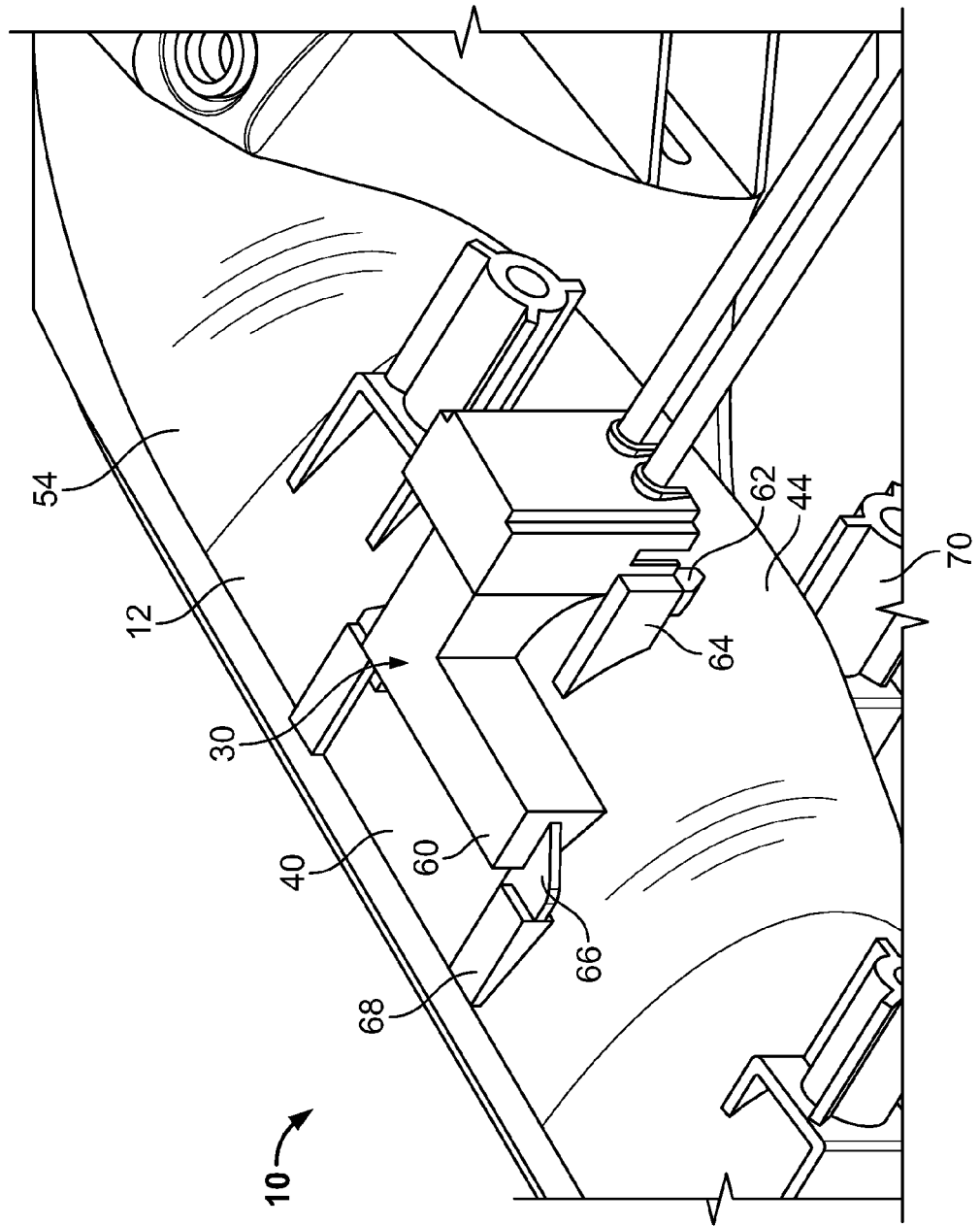
FIG. 3 is a rear perspective view of the handle assembly shown in FIG. 1.

FIG. 3 is a rear perspective view of the handle assembly 10 illustrating the bezel 12 and the lamp assembly 30. The lamp assembly 30 is mounted to the exterior surface 54 of the bezel 12. In the illustrated embodiment, the lamp assembly 30 is mounted proximate to the top 40 and the back 44 of the bezel 12.

The lamp assembly 30 includes a housing 60 having a plurality of latches 62 that engage ribs 64 extending from the bezel 12. The housing 60 also includes a plurality of tabs 66 that engage catches 68 extending from the bezel 12. The housing 60 is held in place relative to the bezel 12 by the catches 68 and the ribs 64. The bezel 12 includes a plurality of mounting features 70 used to mount the bezel 12 within the door panel.

Figure 4:
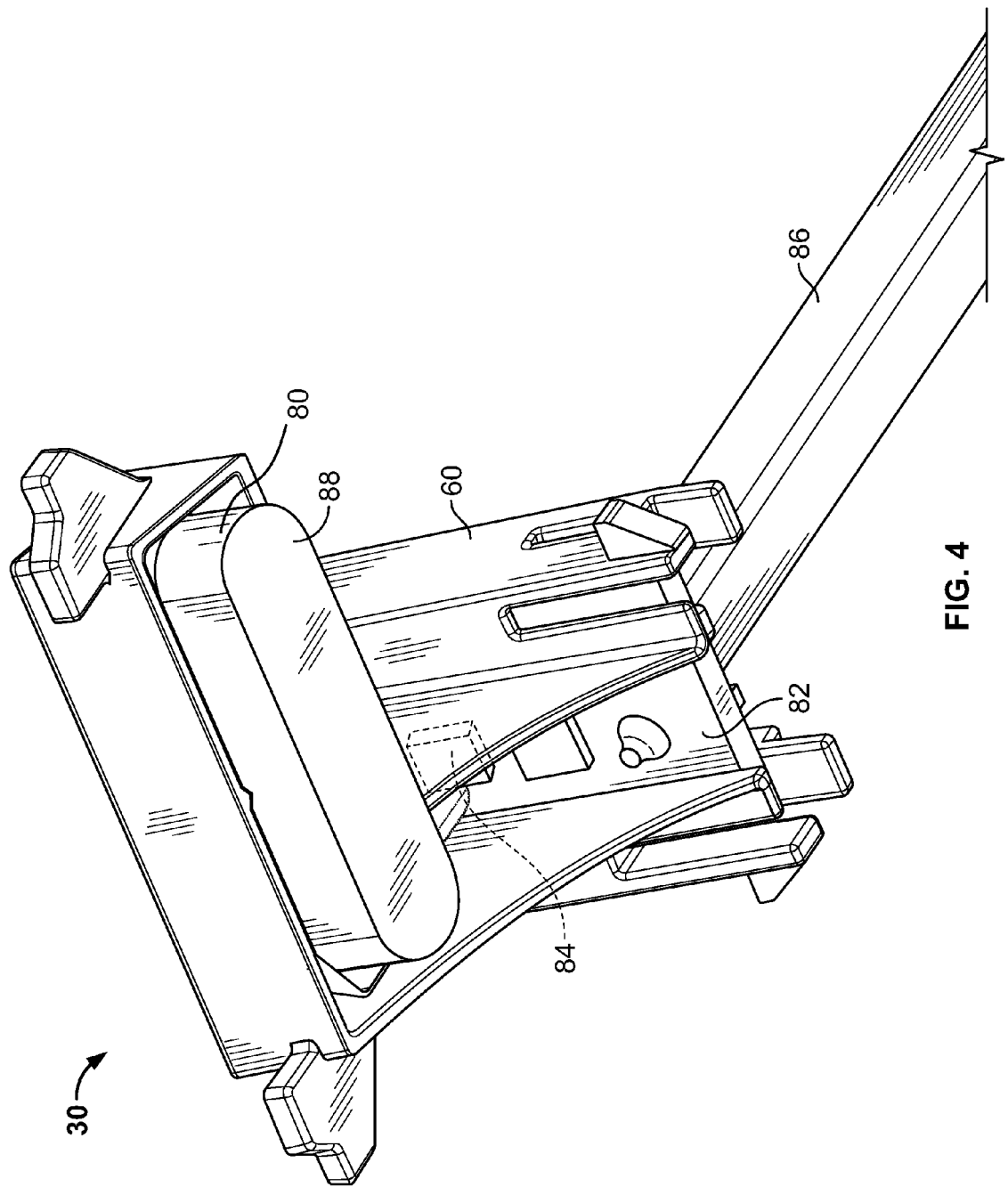
FIG. 4 is a perspective view of an exemplary lamp assembly for the handle assembly.

FIG. 4 is a perspective view of an exemplary lamp assembly 30 illustrating the housing 60. The lamp assembly 30 includes a light pipe 80 held within the housing 60. The lamp assembly 30 also includes a printed circuit board (PCB) 82 held within the housing 60. In an exemplary embodiment, a light source 84 (shown in phantom in FIG. 4) is mounted to the PCB 82. A plurality of wires 86 are terminated to the PCB 82 and control the operation of the light source 84. Optionally, the wires 86 may be held by the housing 60, such as by using ferrules or other holding means. Optionally, a portion of the wall of the housing 60 may be thermally formed or bent to secure the wires 86 in place. In an exemplary embodiment, the light source 84 is a light emitting diode (LED), but other types of light sources may be used in alternative embodiments. The light pipe 80 is arranged within the housing 60 such that the light pipe 80 is substantially aligned with the light source 84 and receives light emitted from the light source 84. The light pipe 80 directs the light from the light source 84 to a lens 88. The lens 88 is configured to extend at least partially into the slot 20 (shown in FIG. 1) when the lamp assembly 30 is mounted to the bezel 12 (shown in FIG. 1). Optionally, the lens 88 may be integrally formed with the light pipe 80. Alternatively, the lens 88 may be coupled to the light pipe 80.

Figure 5:
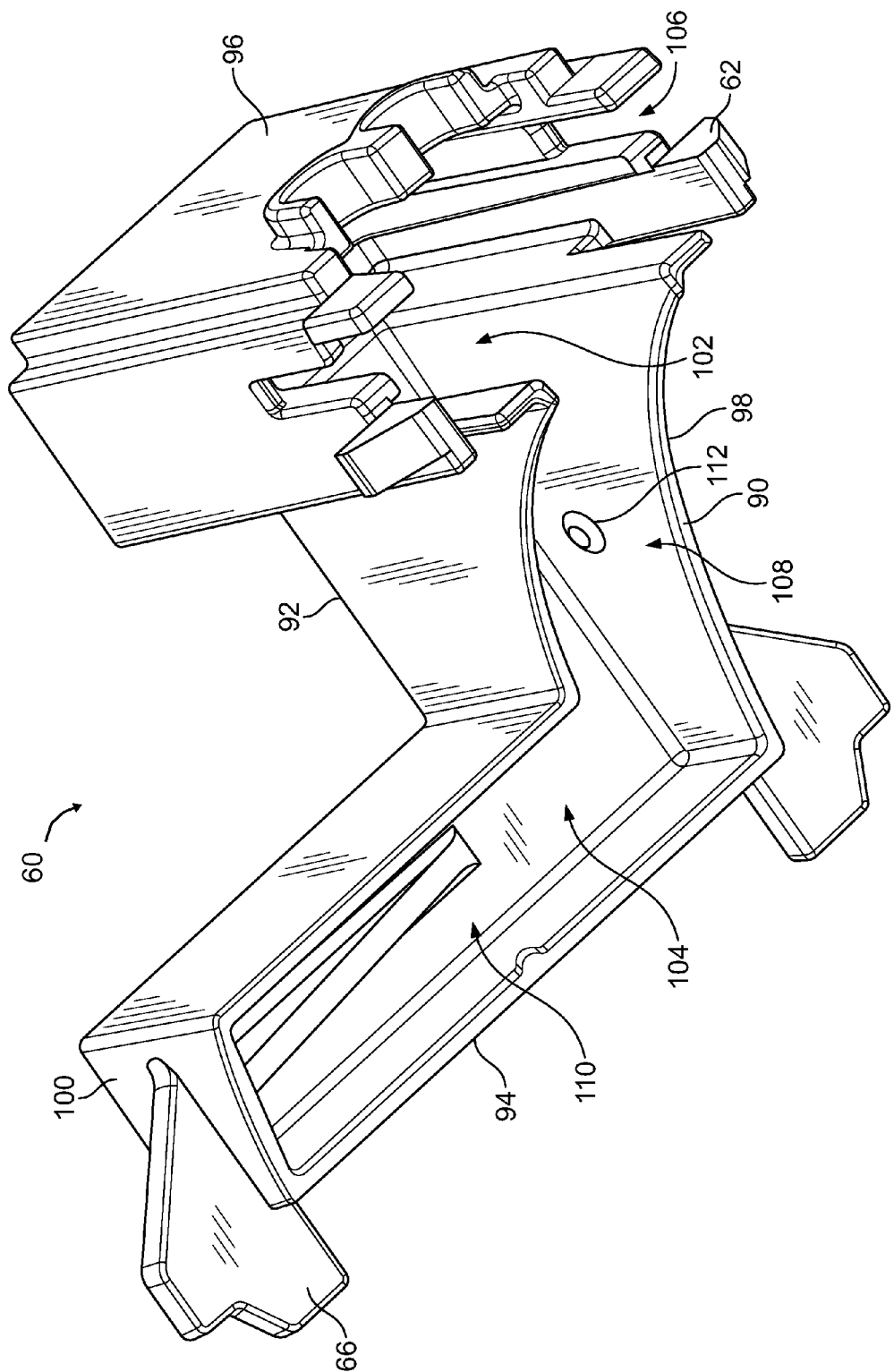
FIG. 5 illustrates a housing of the lamp assembly shown in FIG. 4.

FIG. 5 illustrates the housing 60 of the lamp assembly 30 (shown in FIG. 1). The housing 60 includes an inner surface 90, an outer surface 92, a front 94 and a back 96. In the normal application, where the housing 60 is mounted to the top of the bezel 12 (shown in FIG. 1), the inner surface 90 defines a bottom of the housing 60 and the outer surface 92, defines a top of the housing 60. The housing 60 also includes a first end 98 and a second end 100 opposite the first end 98.

The housing 60 includes a PCB chamber 102 and a light pipe chamber 104. The chambers 102, 104 open to one another inside the housing 60. The PCB chamber 102 is sized and shaped to receive the PCB 82 (shown in FIG. 4) and may include features to retain the PCB 82 within the PCB chamber 102. For example, tabs may be formed in the walls defining the PCB chamber 102 to retain the PCB 82 in the PCB chamber 102. Optionally, the tabs and/or the walls of the PCB chamber 102 may be thermally formed or bent to secure the PCB 82 in the PCB chamber 102. In the illustrated embodiment, the latches 62 are provided on the housing 60 proximate the PCB chamber 102. Slots 106 are provided in the housing 60 proximate the latches 62, such that the latches 62 may be movable or flexible.

The light pipe chamber 104 receives the light pipe 80 (shown in FIG. 4). The light pipe chamber 104 is configured to completely encase the light pipe 80 except for along the inner surface, which faces and may even rest upon the bezel 12 (shown in FIG. 1). The light pipe chamber 104, thus essentially eliminates any stray light from escaping the light pipe 80 away from the bezel 12. The light pipe chamber 104 thus operates as a hood to block light from escaping the light pipe 80 in undesirable directions. In the illustrated embodiment, the light pipe chamber 104 is L-shaped and includes a first portion 108 extending from the PCB chamber 102 and a second portion 110 extending from the first portion 108 at approximately a right angle. The first portion 108 extends approximately from the back 96 to the front 94. The second portion 110 is provided at the front 94 and extends generally from the first end 98 to the second end 100. The housing 60 includes a plurality of retention features 112 for retaining the light pipe 80 in the light pipe chamber 104. In the illustrated embodiment, the tabs 66 extend from the front 94 of the housing 60 proximate the first and second ends 98, 100.

Figure 6:
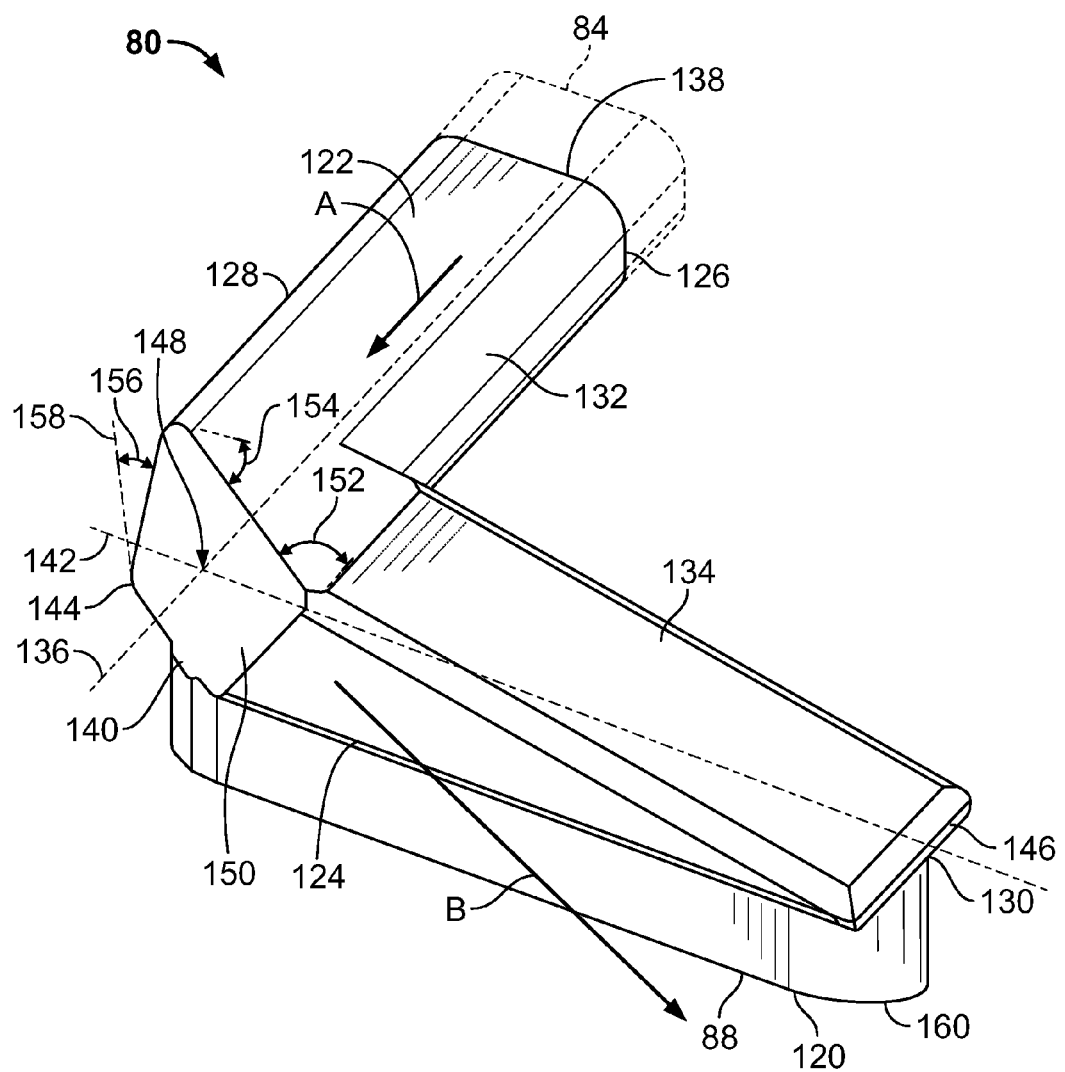
FIG. 6 is a perspective view of a light pipe of the lamp assembly shown in FIG. 4.
Figure 7:
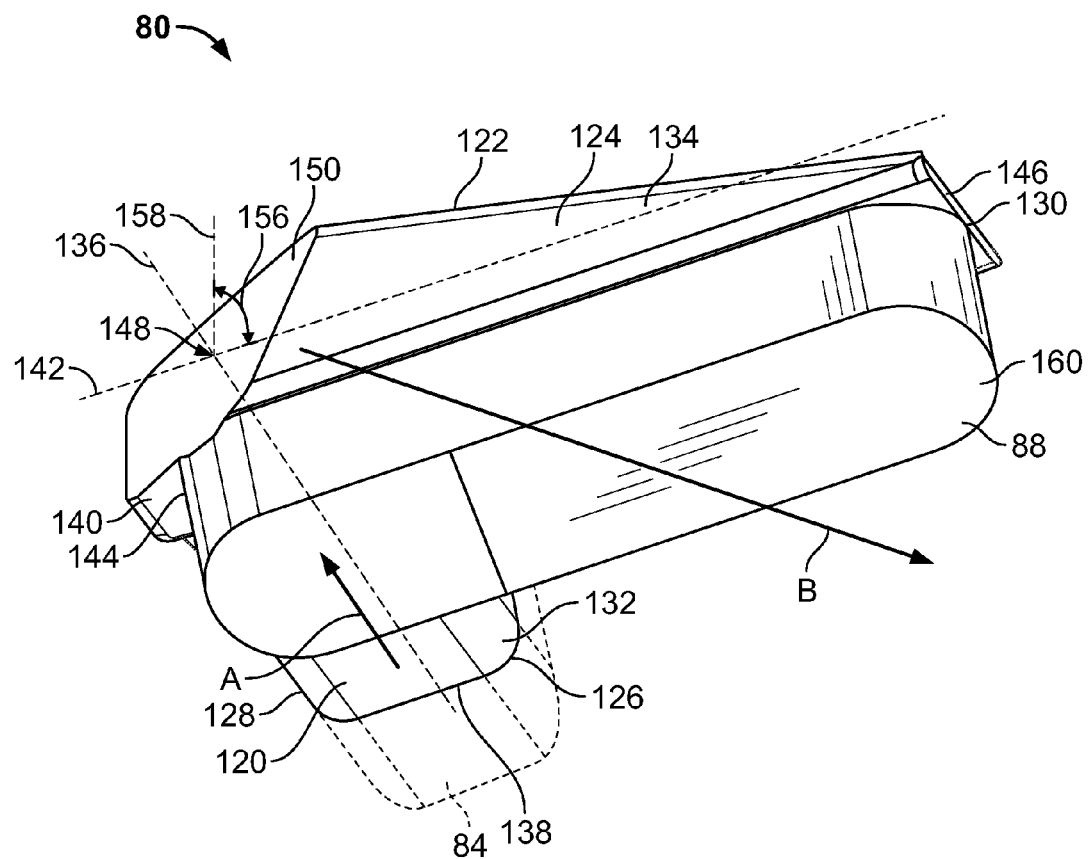
FIG. 7 is another perspective view of the light pipe shown in FIG. 6.

FIGS. 6 and 7 are front perspective views of the light pipe 80. The light pipe 80 includes an inner surface 120, an outer surface 122, a front 124 and a back 126. In the normal application, where the light pipe 80 is mounted to the top of the bezel 12 (shown in FIG. 1), the inner surface 120 defines a bottom of the light pipe 80 and the outer surface 122 defines a top of the light pipe 80. The light pipe 80 also includes a first end 128 and a second end 130 opposite the first end 128.

The light pipe 80 includes a first leg 132 and a second leg 134 extending at an angle from the first leg 132. In an exemplary embodiment, the second leg 134 is generally perpendicular to the first leg 132, however the second leg 134 may extend at a different, non-right angle in alternative embodiments. The first leg 132 extends along a primary axis 136 from a back end 138 to a front end 140. In an exemplary embodiment, the light pipe 80 is arranged within the housing 60 (shown in FIG. 2) such that the back end 138 of the first leg 132 is positioned proximate to the light source 84, which is shown in phantom in FIGS. 6 and 7. Light emitted by the light source 84 is received by the light pipe 80 through the back end 138 and directed along the primary axis 136 down the first leg 132 from the back end 138 to the front end 140, such as in the lighting direction shown by arrow A. The second leg 134 extends along a secondary axis 142 from a first leg end 144 to a second leg end 146. The first leg end 144 is positioned proximate, or may be positioned at, the first end 128 of the light pipe 80 and the second leg end 146 is positioned proximate, or may be positioned at, the second end 130 of the light pipe 80. The light directed down the first leg 132 is directed from the first leg 132 along the second leg 134 generally along the secondary axis 142 toward the second leg end 146, such as in the lighting direction shown by arrow B. The primary and secondary axes 136, 142 are generally perpendicular in an exemplary embodiment and define a light pipe plane 148. In the normal application, where the light pipe 80 is mounted to the top of the bezel 12, the light pipe 80 and light pipe plane 148 are oriented generally horizontally.

In an exemplary embodiment, the light pipe 80 includes an angled primary reflective surface 150. The primary reflective surface 150 is provided at the intersection of the first and second legs 132, 134. In an exemplary embodiment, the primary reflective surface 150 has a trapezoidal shape with a shorter segment generally along the inner surface 120 and a longer segment generally along the outer surface 122. The primary reflective surface 150 operates to direct the light from the first leg 132 to the second leg 134, and ultimately through the lens 88. The angle and orientation of the primary reflective surface 150 controls the angle that the light is directed. In an exemplary embodiment, the primary reflective surface 150 is tilted at a first angle 152 (shown in FIG. 6) with respect to the primary axis 136 and a second angle 154 (shown in FIG. 6) with respect to the secondary axis 142. The first and second angles 152, 154 may be acute angles and may be different than one another. The tilt angles 152, 154 control the direction of the light down the second leg 134 with respect to the secondary axis 142. Optionally, the tilt angles 152, 154 may be selected to direct the light generally parallel to the secondary axis 142. However, the tilt angles 152, 154 may be selected to direct the light transverse to and generally across the secondary axis 142 either in a forward direction (e.g. toward the front 124 of the second leg 134) or in a rearward direction (e.g. toward the back 126 of the second leg 134). By controlling the angles 152, 154 the severity and amount of light directed either forward or rearward may be controlled.

In an exemplary embodiment, the primary reflective surface 150 is sloped at a third angle 156 with respect to a transverse axis 158. The transverse axis 158 is generally perpendicular to the light pipe plane 148. In the normal application, where the light pipe 80 is oriented such that the light pipe plane 148 is generally horizontal, the transverse axis 158 is generally vertical. The slope angle 156 controls the direction of the light down the second leg 134 with respect to the secondary axis 142. Optionally, the slope angle 156 may be selected to direct the light generally along the transverse axis 158 toward the inner surface 120 of the second leg 134. The lens 88 is positioned along the inner surface 120 of the second leg 134 such that the slope angle 156 is selected to direct the light toward the lens 88. The tilt angles 152, 154 and the slope angle 156 cooperate to control the emitted lighting direction shown by arrow B. For example, in an exemplary embodiment, the emitted lighting direction is generally downward into the handle cavity 14 (shown in FIG. 2), generally rearward toward the cavity wall 16 (shown in FIG. 2), and generally outward toward the second end 48 of the bezel 12 (shown in FIG. 2). As such, the light emitted from the light pipe 80 through the lens 88 may be focused to the target area 56 (shown in FIG. 2).

In an exemplary embodiment, the outer surface 122 of the second leg 134 is angled toward the inner surface 120 along the second leg 134 from proximate to the first leg end 144 to the second leg end 146. As such, the second leg 134 is skinnier at the second leg end 146. By angling the outer surface 122, light directed down the second leg 134 that is not directed toward the lens 88 by the primary reflective surface 150 is directed toward the lens 88 by the outer surface 122. As such, the outer surface 122 of the second leg 134 operates as a secondary reflective surface. Other surfaces of the light pipe 80 may also operate as secondary reflective surfaces to redirect the light in the light pipe 80. In an exemplary embodiment, the exterior surfaces of the light pipe 80 are configured to reflect the light in the light pipe 80, such that the light pipe 80 is subject to total internal reflection. The lens 88 allows the light to be emitted therefrom. In an exemplary embodiment, the lens 88 includes a slanted surface 160. The slanted surface is slanted in a direction from the front to the back of the lens 88. The front of the lens 88 is shorter than the back of the lens 88. The slanted surface 160 may be used to direct the light from the lens 88 in a controlled manner. Optionally, the lens 88 may be curved.

An exemplary assembly and operation is described with reference to the above described Figures. The handle assembly 10 includes the lamp assembly 30 mounted to an exterior of the bezel 12. The light pipe 80 and the PCB 82 may be pre-loaded into the housing 60 prior to mounting the housing 60 to the bezel 12. When the light pipe 80 and the PCB 82 are loaded into the respective chambers 102, 104, the light pipe 80 is aligned with the light source 84 and receives light from the light source 84. Optionally, the light pipe 80 may be mounted to the PCB and/or may be integrally formed with the light source 84 and loaded into the housing 60 as a unit. Once assembled within the housing 60, the housing 60 is mounted to the bezel 12 and the lens 88 is aligned with the slot 20 in the bezel 12. Optionally, the lens 88 may extend into and/or through the slot 20. The lens 88 may be held within the slot 20, such as by a friction fit. In an exemplary embodiment, the lamp assembly 30 is mounted to the bezel 12 such that the lens 88 is positioned at the top 40 of the bezel 12. The lens 88 may be substantially centered between the first and second ends 46, 48 generally vertically above the handle 22.

During operation, the light source 84 is activated to produce light. The light is directed into the light pipe 80 through the back end 138 of the first leg 132 of the light pipe 80. The light is directed along the primary axis 136 toward the front end 140 and the primary reflective surface 150 at the front end 140. The primary reflective surface changes the direction of the light and directs the light down the second leg 134. The primary reflective surface 150 is angled at a predetermined orientation with respect to the first lighting direction, shown by arrow A in FIGS. 6 and 7, to control the angle of illumination of the lamp assembly 30 and thus focus the light to the target area 56. In an exemplary embodiment, the primary reflective surface 150 is angled at a tilt angle 152, 154 to control the forward and/or rearward direction of the light through the lens 88 (e.g. the angle of illumination toward the front 18 or the back 44, respectively, of the bezel 12). For example, by increasing the tilt angle 152, 154, the light may be directed more rearward (e.g. toward the back 44 of the bezel 12) or by decreasing the tilt angle 152, 154, the light may be directed more forward (e.g. toward the front 18 of the bezel 12). In an exemplary embodiment, the primary reflective surface 150 is angled at a slope angle 156 to control the downward direction of the light through the lens 88 (e.g. the angle of illumination toward the bottom 42 of the bezel 12). For example, by increasing the slope angle 156, the light may be directed more vertically downward or by decreasing the slope angle 156, the light may be directed further outward toward the second end 48 of the bezel 12.

As such, a handle assembly 10 is provided with a lamp assembly 30 for illuminating the handle cavity 14 of the handle assembly 10. The lamp assembly includes the light pipe 80 having the primary reflective surface 150 that controls the angle of illumination of the light pipe 80. The primary reflective surface 150 is angled at a certain angle to control the angle of illumination, and thus focus the light to the target area 56. In an exemplary embodiment, the target area 56 is generally rearward toward the cavity wall 16 and outward toward the second end 48 of the bezel 12. As such, the portion of the bezel most visible to the occupant, such as proximate the free end 26 of the handle 22, is illuminated with the most intense light and areas around that target area are illuminated to a lesser extent. As such, more illumination is provided and/or a light source that is smaller and/or uses less power may be used to illuminate the bezel 12. As such, a lamp assembly 30 is provided in a cost effective and reliable manner.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A handle assembly comprising:
a bezel having a handle cavity defined by a cavity wall and an open front providing access to the handle cavity, the bezel having a slot through the cavity wall; and
a lamp assembly mounted to the bezel proximate the slot, the lamp assembly includes a housing and a light pipe held by the housing, the light pipe includes a first leg extending along a primary axis and a second leg extending along a secondary axis generally perpendicular with respect to the primary axis, the second leg having a lens along an inner surface of the second leg, wherein light is directed through the light pipe along the primary axis to a primary reflective surface provided at the intersection of the first and second legs, the primary reflective surface directs light along the second leg toward the lens.

2. The handle assembly of claim 1, wherein the inner surface generally faces the bezel.

3. The handle assembly of claim 1, wherein the lens is aligned with the slot.

4. The handle assembly of claim 1, wherein the light pipe further extends along a transverse axis perpendicular to the primary axis and the secondary axis, the primary reflective surface being oriented non-parallel to each of the primary axis, secondary axis and transverse axis.

5. The handle assembly of claim 1, wherein the primary axis and the secondary axis define a light pipe plane, the primary reflective surface lying across the light pipe plane and directing light out of the light pipe plane.

6. The handle assembly of claim 1, wherein the cavity wall includes a bezel interior surface and a bezel outer surface, the lamp assembly being mounted to the bezel outer surface and the light from the light pipe illuminates the bezel interior surface.

7. The handle assembly of claim 6, wherein the bezel includes a top, a bottom and a back opposite to the front, the lamp assembly being mounted to the top of the bezel with the primary axis extending generally in a direction from the back to the front, the light pipe directing light generally toward the bottom and the back.

8. The handle assembly of claim 6, wherein the bezel includes a top, a bottom, a first end and a second end, the bezel having an opening proximate the first end that is configured to receive a handle, the secondary axis extending generally in a direction from the first end to the second end, wherein the light pipe directs light generally toward the bottom and the second end.

9. A lamp assembly for illuminating a bezel of a handle assembly, the lamp assembly comprising:
 a housing having at least one chamber;
 a light source received in the at least one chamber; and
 a light pipe received in the at least one chamber proximate the light source, the light pipe having an inner surface and an outer surface opposite the inner surface, the light pipe received in the housing such that the inner surface is configured to face the bezel, the light pipe having a front, a back, a first end and a second end opposite the first end, the light pipe received in the housing such that the back is positioned proximate the light source, the light pipe having a first leg extending longitudinally from the back to the front and a second leg extending longitudinally from the first leg to the second end, the second leg being generally perpendicular with respect to the first leg, the light pipe having a primary reflective surface positioned at the front of the first leg at the intersection of the first leg and the second leg, the primary reflective surface being angled toward the second leg to direct light generally along a secondary axis of the second leg and the primary reflective surface being angled toward the inner surface to direct the light toward the bezel.

10. The lamp assembly of claim 9, wherein the second leg includes a lens along the inner surface of the second leg, the light pipe directing the light through the lens.

11. The lamp assembly of claim 9, wherein the first leg extends along a primary axis, the light being directed from the light source along the primary axis to the primary reflective surface.

12. The lamp assembly of claim 9, wherein the primary reflective surface has a trapezoidal shape with one side of the primary reflective surface defined by the first leg and another side of the primary reflective surface defined by the second leg.

13. The lamp assembly of claim 9, wherein the outer surface of the second leg is angled toward the inner surface from the first leg to the second end, the outer surface of the second leg directing light toward the inner surface of the second leg.

14. The lamp assembly of claim 9, wherein the housing covers the light pipe such that only the inner surface of the light pipe is exposed.

15. The lamp assembly of claim 9, wherein the light is directed from the light pipe through the inner surface at an angle such that the light shines beyond the second end.

16. A lamp assembly for illuminating a bezel of a handle assembly, the lamp assembly comprising:
 a housing configured to be mounted to the bezel; and
 a light pipe received in the housing, the light pipe having a first leg extending along a primary axis and a second leg extending along a secondary axis generally perpendicularly from the first leg, the second leg having a lens along an inner surface of the second leg, the light pipe having a primary reflective surface at the intersection of the first leg and the second leg, the primary reflective surface being angled at a tilt angle to direct the light generally along the secondary axis and the primary reflective surface being angled at a slope angle to direct the light toward the lens, wherein the light is emitted from the lens at an angle transverse to the primary axis and the secondary axis.

17. The lamp assembly of claim 16, wherein the light is directed through the lens at an angle such that the light shines beyond the second leg.

18. The lamp assembly of claim 16, wherein the light pipe extends along a transverse axis that is generally perpendicular to the primary and secondary axes and is oriented generally vertically, the slope angle directs the light generally along the transverse axis.

19. The lamp assembly of claim 16, wherein the primary and secondary axes cooperate to define a light pipe plane, the housing being mounted to the bezel such that the light pipe plane is generally horizontal, the slope angle directing light out of the light pipe plane toward the inner surface.

20. The lamp assembly of claim 16, wherein an outer surface of the second leg opposite to the inner surface is angled toward the inner surface from the first leg to a second leg end of the second leg, the outer surface of the second leg directing light toward the inner surface of the second leg.

21. The handle assembly of claim 1, wherein the primary reflective surface has a trapezoidal shape with one side of the primary reflective surface defined by the first leg and another side of the primary reflective surface defined by the second leg.

22. The handle assembly of claim 1, wherein the second leg includes an outer surface angled toward the inner surface from the first leg to a distal end of the second leg, the outer surface of the second leg directing light toward the inner surface of the second leg.

23. The handle assembly of claim 1, wherein the first and second legs are formed integral with one another as a solid light pipe.

* * * * *